United States Patent [19]

Eagan

[11] 3,957,496

[45] May 18, 1976

[54] MOLYBDENUM SEALING GLASS-CERAMIC COMPOSITION

[75] Inventor: Robert J. Eagan, Cedar Crest, N. Mex.

[73] Assignee: The United States of America as represented by the United States Energy Research and Development Administration, Washington, D.C.

[22] Filed: Sept. 23, 1975

[21] Appl. No.: 615,961

[52] U.S. Cl. .................................. 106/39.8; 65/33; 65/59 R; 156/89
[51] Int. Cl.² .................. C03C 3/22; C03C 3/04; C03C 3/30
[58] Field of Search ............. 106/39.8, 39.6; 65/33

[56] References Cited
UNITED STATES PATENTS

| | | | |
|---|---|---|---|
| 3,504,819 | 4/1970 | Veres.................................. | 106/39.8 |
| 3,785,837 | 1/1974 | Amin.................................. | 106/39.8 |
| 3,787,219 | 1/1974 | Amin.................................. | 106/39.8 |

*Primary Examiner*—Winston A. Douglas
*Assistant Examiner*—Mark Bell
*Attorney, Agent, or Firm*—Dean E. Carlson; Dudley W. King; Ignacio Resendez

[57] ABSTRACT

The invention relates to a glass-ceramic composition having low hydrogen and helium permeability properties, along with high fracture strength, a thermal coefficient of expansion similar to that of molybdenum, and adaptable for hermetically sealing to molybdenum at temperatures of between about 900° and about 950°C. to form a hermetically sealed insulator body.

5 Claims, 4 Drawing Figures

MOLYBDENUM SEALING GLASS-CERAMIC COMPOSITION

BACKGROUND OF INVENTION

The invention relates to a glass-ceramic composition having a low helium permeability and especially suitable for sealing to molybdenum.

Some requirements that are generally recognized as necessary for envelope materials for such as gas tubes or for long-life vacuum tubes are that the materials have a low permeability to gases, particularly helium and hydrogen, and that the materials be sufficiently refractory to permit high-temperature brazing and bake-out of the tubes. Tube designers have attempted to cope with these requirements by employing solder coated nickel-iron-cobalt alloys or by employing molybdenum with alumina ceramics for insulator parts. Use of these materials has presented additional problems in that the expansion characteristics generally do not match those of the ceramics thereby resulting in restrictions on designs. Additionally, prior tube materials have necessitated that fired ceramic be machined to achieve the desired configurations and have also necessitated multiple firings to initially deposit the braze material on the ceramic and metal surfaces to be contacted to and subsequently seal these surfaces to a seal member and thereby make ceramic-to-metal seals, resulting in fabrication processes and products that are difficult to accomplish and not economically desirable.

In some instances, hydrogen and helium impermeability is desired because the gas or vacuum tubes may be operated in a gaseous environment, such as a hydrogen or helium environment, and permeation of these gases into the tubes would result in a premature failure or a detrimental effect upon the tube by adversely affecting the tube hold-off strengths, tube switching characteristics, or the like.

The development of glass-ceramics, that is, materials that are melted and formed as a glass and subsequently crystallized to form a ceramic, has done much to alleviate prior art problems. However, known glass-ceramics still have limitations, including an objectionable differential between the thermal expansion of the glass ceramic and the molybdenum, a relatively high permeability to helium, and a relatively high temperature requirement for sealing to molybdenum such as, for example, from about 1000° to about 1050°C.

SUMMARY OF INVENTION

In view of the above limitations and drawbacks, it is an object of this invention to provide a glass-ceramic composition that has low permeability to helium and that is adaptable for electronic tube or other usage in a helium and/or hydrogen environment.

It is a further object of this invention to provide a glass-ceramic composition useful as an insulator body that may be sealed directly to molybdenum at the relatively low temperatures of from about 900° to about 950°C. without necessitating further seal materials to form a thermal expansion gradient between the ceramic and the metal.

It is a further object of this invention to provide an improved glass-ceramic composition for an insulator body to form ceramic to metal seals that reduces or minimizes the above cited limitations.

It is a further object of this invention to provide a glass-ceramic composition having thermal expansion coefficients that are similar to those metals such as molybdenum.

It is a further object of this invention to provide glass-ceramic compositions that form high strength seals directly to molybdenum.

Various other objects and advantages will appear from the following description of the invention, and the most novel features will be particularly pointed out hereinafter in connection with the appended claims. It will be understood that various changes in the details and materials which are herein described and illustrated in order to explain the nature of the invention may be made by those skilled in the art without departing from the scope of the invention.

The invention comprises a glass-ceramic composition useful for insulator body hermetic sealing to a metal, the composition including silicon dioxide ($SiO_2$), aluminum oxide ($Al_2O_3$), calcium oxide (CaO), magnesium oxide (MgO), barium oxide (BaO), zinc oxide (ZnO), sodium oxide ($Na_2O$), cobalt oxide (CoO), titanium dioxide ($TiO_2$), and at least one of the oxides of phosphorous pentoxide ($P_2O_5$) and zirconium oxide ($ZrO_2$). The constituents of these glass compositions may be at from about 38 to about 42 weight percent (wt. %) $SiO_2$, from about 8.0 to about 10.0 wt. % $Al_2O_3$, from about 2.0 to about 4.0 wt. % CaO, from about 2.0 to about 4.0 wt. % MgO, from about 4.0 to about 6.0 wt. % BaO, from about 30 to about 35 wt. % ZnO, from about 2.0 to about 2.8 wt. % $Na_2O$, from about 0.2 to about 0.4 wt. % CoO, from about 0.5 to about 2 wt. % $TiO_2$, and from about 2.5 to about 3.5 wt. % of at least one of the oxides $P_2O_5$ and $ZrO_2$.

DETAILED DESCRIPTION

Figure 1:
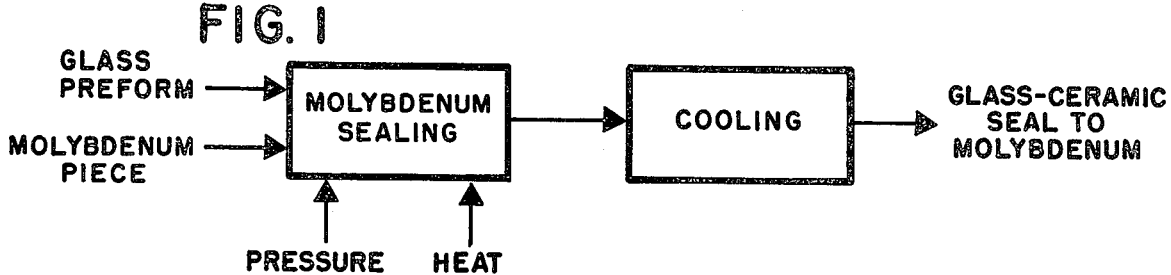
FIG. 1 illustrates a processing sequence for achieving a glass-ceramic insulator body composition to seal directly to molybdenum.

The glass-ceramics of this invention have constituents of $SiO_2$, $Al_2O_3$, CaO, MgO, BaO, ZnO, $Na_2O$, CoO, $TiO_2$, and at least one of the oxides of $P_2O_5$ and $ZrO_2$, with the constituents at weight percents of from about 38 to about 42 wt. % $SiO_2$, from about 8.0 to about 10.0 wt. % $Al_2O_3$, from about 2.0 to about 4.0 wt. % CaO, from about 2.0 to about 4.0 wt. % MgO, from about 4.0 to about 6.0 wt. % BaO, from about 30 to about 35 wt. % ZnO, from about 2.0 to about 2.8 wt. % $Na_2O$, from about 0.2 to about 0.4 wt. % CoO, from about 0.5 to about 2.0 wt. % $TiO_2$, and from about 2.5 to about 3.5 of at least one of the oxides of $P_2O_5$ and $ZrO_2$. A particular example of this glass-ceramic composition of this invention is 40 wt. % $SiO_2$, 3 wt. % $P_2O_5$, 9 wt. % $Al_2O_3$, 3 wt. % CaO, 3 wt. % MgO, 5.2 wt. % BaO, 33.0 wt. % ZnO, 2.6 wt. % $Na_2O$, 0.2 wt. % CoO, and 1.0 wt. % $TiO_2$. Another example of the glass-ceramic composition of this invention is about 40.6 weight percent silicon dioxide, about 9.0 weight percent aluminum oxide, about 3.0 weight percent calcium oxide, about 3.0 weight percent magnesium oxide, about 5.2 weight percent barium oxide, about 33.0 weight percent zinc oxide, about 2.0 weight percent sodium oxide, about 0.2 weight percent cobalt oxide, about 3.0 weight percent zirconium oxide, and about 1.0 weight percent titanium oxide.

The formation of a glass-ceramic involves melting the raw materials to form a glass, annealing the glass, then heat treating it to induce nucleation and crystallization. The melting temperature may be determined by observation of the glass during melting. To obtain a stress-free glass preform for subsequent use during pressing or forming operations, the glass is annealed, wherein the glass is held at a specified temperature, such as from about 625° to about 650°C., then cooled slowly to avoid imposing thermal gradients which could result in substantial residual stress in the glass at room temperature. Cooling may be effected at an appropriate rate such as, for example, at from about 2° to about 5°C. per minute. The cooling rate selected will be dependent upon the size of the part being cooled, and larger parts may require a slower cooling rate than small parts. The annealing temperature should desirably be accurately maintained when annealing glass-ceramics because the nucleation temperature under certain conditions may be close to the annealing temperature. The annealing temperature, approximate nucleating temperature, and crystallization temperature may be determined by differential thermal analysis as is known in the art.

While there are various ways or procedures that may be employed in preparing the glass-ceramics of this invention, one that may be used is that of premixing the components prior to melting, fusing the mixture in a platinum crucible, which fusing results in glass compositions which are melted for from about 12 to about 24 hours at from about 1500° to about 1600°C. in a suitable heating means such as an electric furnace. Toward insuring homogeneity, the glass may be stirred continuously, in some instances for up to about 18 hours, during said melting and heating. Although other than reagent grade chemicals of widely varying particle size may be used depending upon application demands, it may be desirable to use reagent grade chemicals having a particulate size of equal to or less than about 45 microns. This provides desired melting rates and promotes homogeneity.

$ZrO_2$, which functions as a nucleating agent and provides a fine, uniform dispersion of crystals in the glass-ceramic microstructure, may be used in place of all or part of the $P_2O_5$, also a nucleating agent. $ZrO_2$ is added to the powder mixture in the form of zirconium silicate, as is generally known in the art.

The molten glass, after the melting and heating, may be cast to form the preform onto a suitable receptacle such as a steel plate coated with graphite powder which may have been heated to from about 200° to about 350°C., and thereafter the glass may be promptly transferred to an annealing oven preheated to from about 625° to about 650°C. and preferably at about 625°C. The oven or other heating means may be held at that temperature for about 5 minutes and then cooled at a suitable rate such as about 4°C. per minute. Insulator body preforms for seal fabrication for sealing to molybdenum may be formed by casting to the desired configurations in metal or graphite molds.

As shown in FIG. 1, the preform is contacted with molybdenum under pressure and heat conditions to achieve the glass-ceramic insulator body composition hermetic seal directly to molybdenum. The pressure exerted on the preform and the molybdenum to effect the hermetic seal may be such as, for example, from about 1 to about 2 pounds per square inch (psi) at a temperature of from about 900° to about 950°C. It may be desirable or preferable to employ a pressure of about 1.1 psi at a temperature of from about 900° to about 925°C.

The seal between the glass-ceramic composition and the molybdenum is believed to be a result of chemical reduction of cobalt oxide in the glass by the molybdenum with the subsequent formation of molybdenum dioxide resulting from this reduction process, which molybdenum dioxide is adherent to the molybdenum and effects the formation of the molybdenum-glass-ceramic seal.

After retaining the preform in contact with the molybdenum under the above described conditions of temperature and pressure for a suitable length of time such as from about 15 to about 60 minutes and preferably from about 20 to about 35 minutes, the molybdenum in contact with and hermetically sealed to the glass-ceramic is cooled to ambient temperature.

Figure 2:
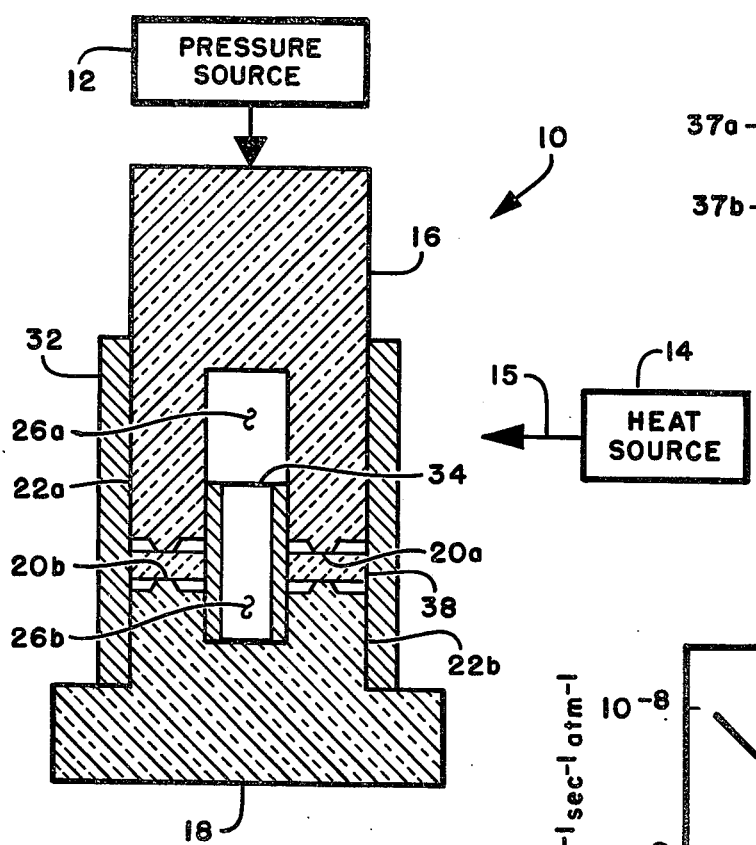
FIG. 2 illustrates in partial cross section an embodiment of an apparatus that may be used to accomplish the glass-ceramic insulator body composition seal to molybdenum.

An apparatus 10 for fabricating the molybdenum-glass-ceramic seal is illustrated in cross section in FIG. 2 and may comprise a pressure source 12, a heat source 14 for providing heat as indicated by arrow 15, and a graphite die having a plunger or top section or member 16 and a base or bottom section or member 18. Plunger 16 and base 18 have appropriate protrusions 20a, 20b, annular configurations 22a, 22b, recesses or cavities 26a, 26b and the like which coact to form the glass-ceramic to molybdenum seal as will be described hereinbelow.

Figure 3:
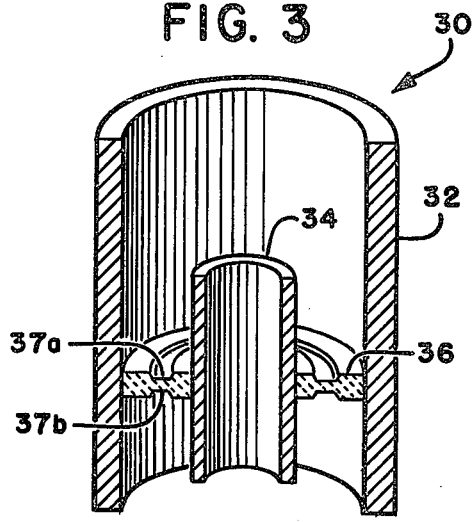
FIG. 3 illustrates a cross section of a glass-ceramic insulator body composition seal to molybdenum sleeves.

FIG. 3 illustrates unit 30 which depicts a glass-ceramic seal to molybdenum made by the process as described in FIG. 1 and by the apparatus 10 shown in FIG. 2. An outer molybdenum sleeve 32 and an inner molybdenum sleeve 34, are joined by an intermediate glass-ceramic material 36. Indentations 37a, 37b facilitate maintaining electrical hold-off strengths corresponding to the protrusions 20a, 20b locations over glass preform 38. Glass-ceramic material 36 is an insulator body that forms a hermetic seal with the molybdenum sleeves and is particularly adaptable for long life vacuum-tube use or long life gas tube use because of its low hydrogen and helium permeability. Unit 30 may be formed by initially disposing outer sleeve 32 in contact with base member 18 about outer cylindrical wall 22b. Inner cylindrical sleeve 34 may be disposed within cavity 26b and thereafter glass preform 38 disposed in position intermediate inner sleeve and outer sleeve. Plunger member 16 may then be disposed over the glass preform 38 such that the plunger slides at its outer annular wall 22a within the inner walls of outer sleeve 32, and inner sleeve 34 extends into cavity or aperture 26a of plunger 16.

Pressure source 12, which may be an automatic type of pressure generating equipment or may simply be a dead weight, applies a pressure upon plunger 16 as the glass 38 melts and thereby molds the glass preform 38 into the glass-ceramic material 36.

In fabricating the glass-ceramic to molybdenum seals, it may be desired that proper cleaning procedures and the handling of the jigs and die members as well as the preforms and sleeves be employed, which procedures are generally known in the art to obtain a hermetic, pore-free seal. For example, the molybdenum sleeves may be cleaned by known cleaning methods, such as by vapor blasting with glass beads or the like, and thereafter vapor degreased prior to chemical etching using suitable materials. After etching is completed, the parts may be passed through a suitable cleaner and then hydrogen fired by heating in a hydrogen atmosphere for a specified time and temperature such as from about 15 to about 60 minutes at a temperature of from about 900° to about 1000°C.

Preform 38 may be vapor degreased, lightly etched in an acid bath, which bath may include from about 4 to about 5 normal hydrofluoric acid and from about 1.2 to about 2.2 normal sulfuric acid at ambient temperature, subsequently rinsed with water, and then cleaned using a suitable cleaner such as ethanol.

The carbon fixtures or dies made of suitable material such as graphite may be cleaned as required by such as vapor blasting to remove contamination, and thereafter may be cleaned ultrasonically in a solvent such as acetone, placed in a vacuum oven and baked out at about 65°C. for about 1 hour. In sealing the preform to the sleeves, upon application of a suitable pressure such as from about 1 to about 2 psi, the molybdenum sleeves and the glass preform may be heated at about 30°C. per minute to a temperature from about 900° to about 950° and preferably to about 925°C., at which point the temperature is held for about 45 minutes in order to allow for oxidation of the molybdenum and crystallization of the glass-ceramic to occur. Thereafter the temperature is reduced to about 750°C. at the rate of about 10°C. per minute and held at about 750°C. for about 20 minutes. The temperature is thereafter reduced to about 650°C. at a suitable rate such as about 1.5°C. per minute and further reduced from 650° to 25°C. or ambient temperature at a suitable rate such as about 10°C. per minute.

Figure 4:
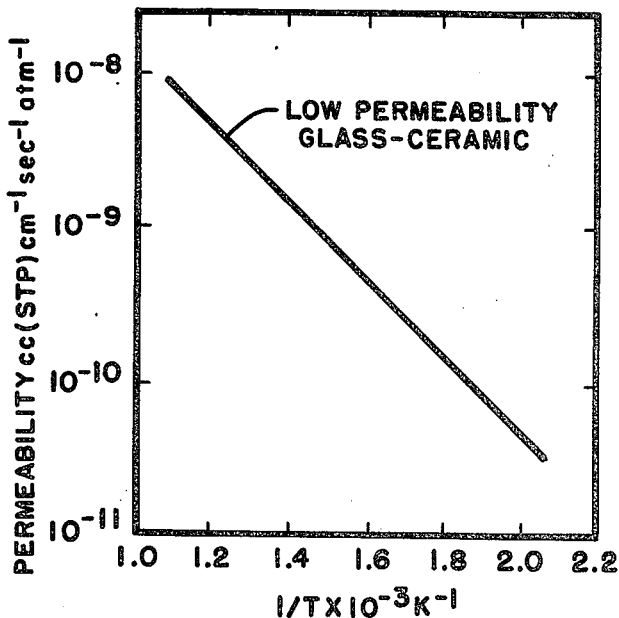
FIG. 4 illustrates the helium permeability of this glass-ceramic as a function of temperature.

A specific glass-ceramic composition useful as an insulator body composition for hermetic sealing to molybdenum in which the constituent weight percent is about 40.0 wt. % $SiO_2$, about 3.0 wt. % $P_2O_5$, about 9.0 wt. % $Al_2O_3$, about 3.0 wt. % CaO, about 3.0 wt. % MgO, about 5.2 wt. % BaO, about 33.0 wt. % ZnO, about 2.6 wt. % $Na_2O$, about 0.2 wt. % CoO, and about 1.0 wt. % $TiO_2$ yielding a glass-ceramic which approximately matches the thermal expansion of molybdenum and has low helium permeability as shown in FIG. 4. This specific glass-ceramic had very good properties for fabricating vacuum tube envelopes, and has a permeability of $2.5 \times 10^{-10}$ cubic centimeters (standard temperature and pressure) seconds$^{-1}$ centimeters$^{-1}$ atmospheres$^{-1}$ (cc (STP) sec$^{-1}$ cm$^{-1}$ atm$^{-1}$) at 300°C.

The coefficient of thermal expansion of this glass-ceramic composition is $52.7 \times 10^{-7}$°C.$^{-1}$ from 25°C. to the set point which is about 750°C. This is close to the coefficient of thermal expansion for molybdenum which is $53 \times 10^{-7}$°C.$^{-1}$ which insures that residual stresses in the glass-ceramic are small.

FIG. 4 describes the helium permeability of this glass-ceramic as a function of temperature. The composition as described herein results in a glass-ceramic of low helium permeability which is especially useful for applications wherein helium and hydrogen impermeability is desired, such as in the fabrication of long-life vacuum tubes or of long life gas tubes. The residual stresses in the glass-ceramic insulator body are small because the thermal expansion of the glass-ceramic closely matches that of molybdenum. In addition, glass-ceramics as described in this application have high strengths such as between about 11 and about 13 thousand pounds per square inch modulus of rupture.

The inclusion of from about 0.2 to about 0.4 wt. % and preferably about 0.2 wt. % CoO has beneficial results in that it acts as an oxidizing agent for the molybdenum. The addition of from about 0.5 wt. % to about 2 wt. % $TiO_2$ and more specifically about 1 wt. % $TiO_2$ increases the fluidity of the glass-ceramic during seal formation. These additions allow the seals to be fabricated at from about 900° to about 950°C. and preferably at about 925°C.

The sealing temperature is an important consideration for the development of the molybdenum-sealing glass-ceramic. Because recrystallization, which reduces the ductility and strength of molybdenum, is a thermally activated process, it may be desirable to minimize recrystallization by reduction of the sealing temperature. The viscosities of the glass-ceramics described in this application are low enough during sealing so that the appropriate deformation can be obtained at about 900°C. This reduction of temperature is feasible because of the use of cobalt oxide in these glass-ceramics.

What we claim is:

1. A glass-ceramic of low helium permeability and high modulus of rupture, of composition consisting essentially of from about 38 to about 42 weight percent silicon dioxide, from about 8 to about 10 weight percent aluminum oxide, from about 2 to about 4 weight percent calcium oxide, from about 2 to about 4 weight percent magnesium oxide, from about 4 to about 6 weight percent barium oxide, from about 30 to about 35 weight percent zinc oxide, from about 2.0 to about 2.8 weight percent sodium oxide, from about 0.2 to about 0.4 weight percent cobalt oxide, from about 0.5 to about 2.0 weight percent titanium dioxide, and from about 2.5 to about 3.5 of at least one of the oxides of phosphorous pentoxide and zirconium oxide.

2. The glass-ceramic of claim 1 for sealing to molybdenum, having a low helium permeability value of about $2.5 \times 10^{-10}$ cubic centimeters (standard temperature and pressure) seconds$^{-1}$ centimeters$^{-1}$ atmospheres$^{-1}$ and a modulus of rupture of equal to or greater than about 11 thousand pounds per square inch, and sealing at a temperature of about 925°C.

3. The glass-ceramic of claim 1 wherein said silicon dioxide is about 40.0 weight percent, said phosphorous pentoxide is about 3.0 weight percent, said aluminum oxide is about 9.0 weight percent, said calcium oxide is about 3.0 weight percent, said magnesium oxide is about 3.0 weight percent, said barium oxide is about 5.2 weight percent, said zinc oxide is about 33.0 weight percent, said sodium oxide is about 2.6 weight percent, said cobalt oxide is about 0.2 weight percent, and said titanium dioxide is about 1.0 weight percent.

4. The glass-ceramic of claim 1 wherein said silicon dioxide is about 40.6 weight percent, said zirconium oxide is about 3.0 weight percent, said aluminum oxide is about 9.0 weight percent, said calcium oxide is about 3.0 weight percent, said magnesium oxide is about 3.0 weight percent, said barium oxide is about 5.2 weight percent, said zinc oxide is about 33 weight percent, said sodium oxide is about 2.0 weight percent, said cobalt oxide is about 0.2 weight percent, and said titanium dioxide is about 1.0 weight percent.

5. A method of making a glass-ceramic for tubes comprising intermixing from about 38 to about 42 weight percent silicon dioxide, from about 8 to about 10 weight percent aluminum oxide, from about 2 to about 4 weight percent calcium oxide, from about 2 to about 4 weight percent magnesium oxide, from about 4 to about 6 weight percent barium oxide, from about 30 to about 35 weight percent zinc oxide, from about 2.4 to about 2.8 weight percent sodium oxide, from about 0.2 to about 0.4 weight percent cobalt oxide, from about 0.5 to about 2 weight percent titanium dioxide, and from about 2.5 to about 3.5 weight percent of at least one of the oxides of phosphorous pentoxide and zirconium oxide, heating said intermixture to from about 1500° to about 1600°C. to melting, maintaining said melt for from about 12 to about 24 hours, cooling said melt to a temperature of from about 625° to about 650°C. and maintaining at this temperature for about 5 minutes, thereafter cooling to ambient temperature at a cooling rate of from about 2° to about 5°C. per minute to cool and anneal said melt and form an initial glass composition preform, disposing said preform adjacent a molybdenum surface, thereafter heating said molybdenum surface and said preform to a temperature of from about 900° to about 950°C. to melt said glass composition, applying a pressure of from about 1 pound per square inch to about 2 pounds per square inch to said glass composition while being so heated to flow said glass composition into contact with said molybdenum surface, holding said temperature and pressure for from about 15 minutes to about 60 minutes, cooling said glass to form a glass-ceramic composition, and thereafter cooling said glass-ceramic composition to ambient temperature providing a glass-ceramic hermetically sealed to said molybdenum surface.

* * * * *